Aug. 30, 1932.                R. G. LE TOURNEAU                1,875,047
                              TRACTOR MOUNTED SCRAPER
                                 Filed Jan. 5, 1931
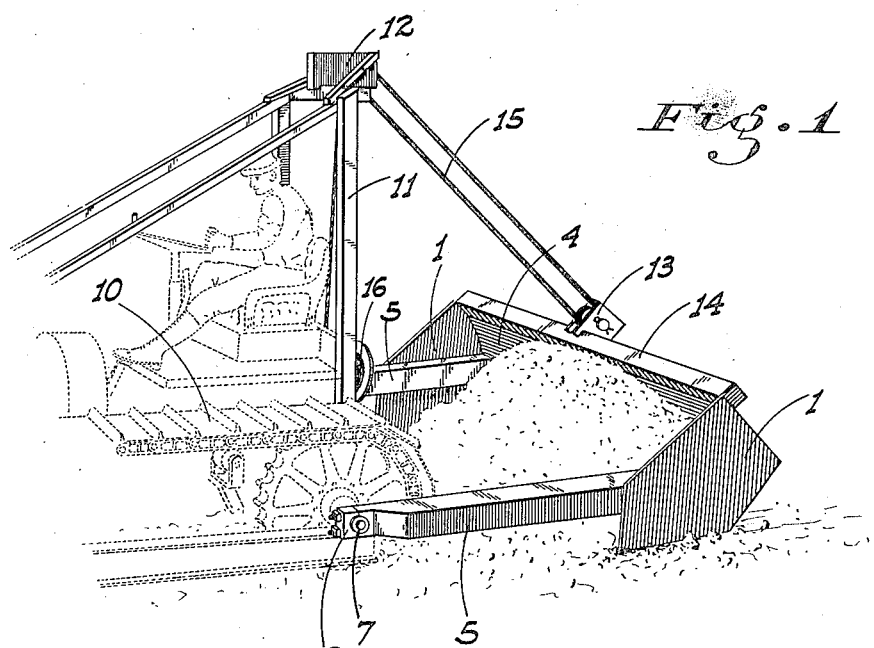
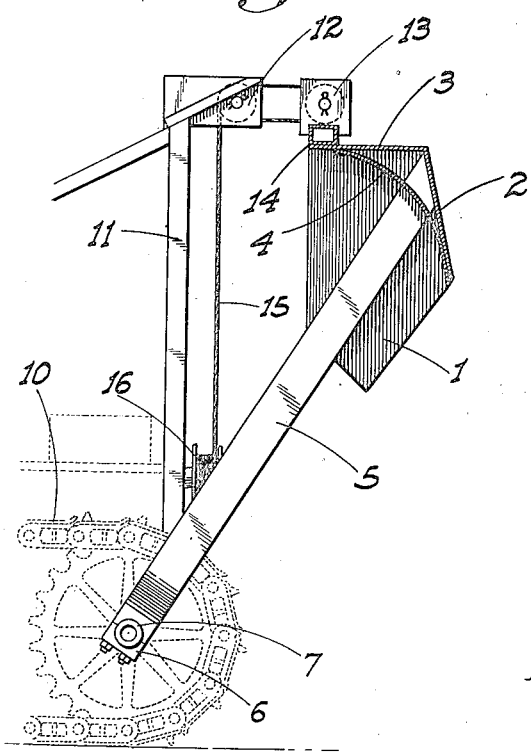
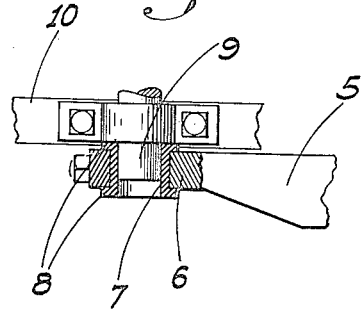
INVENTOR
R. G. Le Tourneau
BY
ATTORNEY Patented Aug. 30, 1932

1,875,047

UNITED STATES PATENT OFFICE

ROBERT G. LE TOURNEAU, OF STOCKTON, CALIFORNIA

TRACTOR-MOUNTED SCRAPER

Application filed January 5, 1931. Serial No. 506,520.

This invention relates to scrapers adapted to be drawn by a tractor, the principal object of my invention being to provide an implement of this general character arranged to be rigidly connected to a tractor against relative freedom of movement laterally or in a horizontal plane, and so as to be close to the tractor. The scraper therefore moves as a unit with the tractor and can be successfully and efficiently used in cramped quarters, or in places where it would be impossible or impracticable to use the usual flexibly connected tractor and scraper units. At the same time the scraper is mounted and arranged to be readily moved vertically relative to the tractor, so that it can be raised clear of the ground and to such an extent as to enable the tractor to be connected to other implements, without interference from the scraper and without detaching the latter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of my scraper as in operation.

Fig. 2 is a longitudinal section of the same as fully raised.

Fig. 3 is a fragmentary section showing the mounting of one of the scraper arms on the tractor.

Referring now more particularly to the characters of reference on the drawing, the scraper comprises side, bottom, and back plates 1, 2, and 3, respectively, which are rigidly connected together and form the dirt engaging bowl whose width is substantially equal to that of the tractor to which the scraper is to be connected. The back and bottom plates contact with each other at right angles and a false concavely curved bottom plate 4 extends inside and is rigidly connected to the bowl-plates from adjacent the top of the back to the forward end of the bottom plate.

This curved plate provides a curved surface for engagement with the dirt and also braces the main back and bottom plates and itself against deflection. The side plates extend some distance in front of the bottom plate so as to confine the dirt for a certain distance ahead of the cutting or forward edge of the bottom plate.

Rigidly secured to and disposed inside the side plates are opposed tension arms 5, of hollow box-beam construction and arranged so as to substantially bisect the angle between the back and bottom plates 2 and 3. At their forward ends these arms are provided with journal boxes 6 which engage collars 7 between the end flanges 8 thereof. These collars in turn are turnably mounted on the adjacent ends of the rear sprocket wheel shafts 9 of the tractor 10, which is of the endless track type such as is almost universally used in hauling scrapers and like implements. The projecting portions of the shaft 9 are very short and the use of the collars, which may extend beyond the ends of the shaft, gives larger bearing surfaces for engagement with the arm journal boxes than would otherwise be the case.

The arms are disposed relative to the bowl so that when the scraper engages the ground, said arms are substantially horizontal. The bottom plates then extend at an upward rearward angle and the bottom edges of the side plates in front of the bottom plates are substantially parallel to and on a level with the ground, as shown in Fig. 1. The arms are relatively short so that the scraper is close to the tractor. The scraper will thus not only closely follow the turning movements of the tractor, but provides a unit with the tractor which can obviously be operated within relatively narrow confines.

To raise and lower the scraper I provide the following means: A rigid derrick structure 11 is erected on the tractor at its rear end, on the upper end of which is mounted a sheave block 12. Another sheave block 13 is mounted in transverse alinement with the block 12 on a rigid cross-beam 14 which is secured on top of the bowl at the back of the same. A cable 15 extends from a winding drum 16 on the back of the tractor to the block 12 and thence to the block 13. The cable engages the sheaves of said blocks in such a manner that with a winding of the cable onto the drum the scraper will be raised, turning of course on the pivotal connections of the arms with the shaft 9 as an axis. The winding drum is preferably a part of the power unit structure shown in my copending application for patent, Serial No. 512,979 filed February 2, 1931.

The length of the arms relative to the height of the derrick and the position of the sheave blocks on the respective parts is such that when the scraper is raised to its full limit, the sheave blocks are substantially in horizontal alinement with each other, and the arms 5 approach a vertical position. With the scraper in this position it projects but little rearwardly of the tractor and the rear end of the latter is freely exposed below the scraper, allowing the tractor to be connected to another implement if desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. The combination with a tractor, of rigid arms pivoted to the tractor adjacent the rear end thereof and projecting rearwardly therefrom, a scraper rigidly mounted on the outer ends of the arms whereby the arms and scraper will move as a unit with the tractor through any lateral movements of such tractor, and means to swing the arms and scraper upwardly on the pivotal connections to carry the scraper to a position above the tractor mechanism such that other implements may be attached to and drawn by the tractor without interfering with the tractor.

2. A device as in claim 1 in which the pivotal connections between the arms and tractor comprise the projecting stubs from the drive wheel shafts of the tractor, relatively long flanged collars thereon and journal boxes on the ends of the arms about the collars between the flanges thereof.

In testimony whereof I affix my signature.

ROBERT G. LE TOURNEAU.